(12) United States Patent
Liu et al.

(10) Patent No.: US 11,294,353 B2
(45) Date of Patent: Apr. 5, 2022

(54) SPINDLE THERMAL ERROR COMPENSATION METHOD INSENSITIVE TO COOLING SYSTEM DISTURBANCE

(71) Applicant: DALIAN UNIVERSITY OF TECHNOLOGY, Dalian (CN)

(72) Inventors: Kuo Liu, Dalian (CN); Bo Qin, Dalian (CN); Xu Li, Dalian (CN); Yongquan Gan, Dalian (CN); Wei Han, Dalian (CN); Renjie Huang, Dalian (CN); Yongqing Wang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 109 days.

(21) Appl. No.: 16/636,556

(22) PCT Filed: Feb. 21, 2019

(86) PCT No.: PCT/CN2019/075712
§ 371 (c)(1),
(2) Date: Feb. 4, 2020

(87) PCT Pub. No.: WO2020/155228
PCT Pub. Date: Aug. 6, 2020

(65) Prior Publication Data
US 2021/0048793 A1 Feb. 18, 2021

(30) Foreign Application Priority Data

Jan. 31, 2019 (CN) .......................... 201910099608.7

(51) Int. Cl.
*G05B 19/4155* (2006.01)
(52) U.S. Cl.
CPC ................. *G05B 19/4155* (2013.01); *G05B 2219/49219* (2013.01)

(58) Field of Classification Search
CPC ...... G05B 19/4155; G05B 2219/49219; G05B 19/404; G05B 2219/49206;
(Continued)

(56) References Cited

U.S. PATENT DOCUMENTS

| 5,623,857 A * | 4/1997 | Sakuraba | ............... B23Q 15/18 82/1.11 |
| 6,456,896 B1 * | 9/2002 | Ito | ........................ G05B 19/404 700/174 |

(Continued)

FOREIGN PATENT DOCUMENTS

| CN | 106444628 A | 2/2017 |
| CN | 107918357 A | 4/2018 |
| TW | 201037268 A | 10/2010 |

OTHER PUBLICATIONS

Office Action dated Dec. 3, 2019 in corresponding CN Application 201910099608.7 with English translation, 8 pages.

*Primary Examiner* — Darrin D Dunn
(74) *Attorney, Agent, or Firm* — Muncy, Geissler, Olds & Lowe, PC

(57) ABSTRACT

A spindle thermal error compensation method which is insensitive to the disturbance of the cooling system is provided, belonging to the technical field of error compensation in numerical control machine tools. First, the spindle model coefficient identification test, based on multi-state speed variable, is performed; after which, based on the correlation analysis between temperature and thermal error, the temperature measurement point, significantly correlated with the axial thermal error of the spindle, is determined. Next, a spindle thermal error model is established, which is insensitive to the cooling system disturbance. In addition, the coefficients in the model are identified under constraint condition, according to the nonlinear quadratic programming algorithm. Finally, based on the OPC UA communi- (Continued)

cation protocol, the compensation value, as calculated by the model, is input to the numerical control system, in order to realize the compensation of the spindle thermal error.

1 Claim, 3 Drawing Sheets

(58) Field of Classification Search
CPC .......... G05B 2219/49209; G05B 2219/49207; G05B 2219/49204; G05B 2219/14043; G05B 2219/37428; G05B 2219/37436; G05B 2219/49102; G05B 2219/49218
See application file for complete search history.

(56) References Cited

U.S. PATENT DOCUMENTS

| 8,255,075 | B2 | 8/2012 | Ou et al. | |
|---|---|---|---|---|
| 2002/0004688 | A1* | 1/2002 | Kojima | B23Q 3/15534 |
| | | | | 700/193 |
| 2008/0215178 | A1* | 9/2008 | Senda | B23Q 15/18 |
| | | | | 700/175 |
| 2012/0271439 | A1* | 10/2012 | Yamamoto | B23Q 15/18 |
| | | | | 700/73 |
| 2016/0334779 | A1* | 11/2016 | Takeno | G05B 19/404 |
| 2019/0235471 | A1* | 8/2019 | Maekawa | G05B 19/408 |
| 2020/0230764 | A1* | 7/2020 | Mizoguchi | B23Q 11/0007 |

* cited by examiner

SPINDLE THERMAL ERROR COMPENSATION METHOD INSENSITIVE TO COOLING SYSTEM DISTURBANCE

TECHNICAL FIELD

The invention belongs to the technical field of error compensation in numerical control machine tools, specifically relates to a method, for compensating the spindle thermal error, insensitive to the disturbance of the cooling system.

BACKGROUND

During the operation of the machine, many internally located sources (such as bearings and motors) generate heat. Such heat is transferred to the various parts of the machine, causing thermal deformations, which subsequently create thermal errors. This development not only affects the machining accuracy of individual workpieces, but also the consistency of batch machining. In the field of precision machining, machine tool thermal error has become a major factor in the process accuracy. In order to reduce the influence of thermal error on the machining accuracy, the machine must be operated for a certain period of time, after it is turned on, leading to energy waste and reduced processing efficiency.

At present, there are two main methods for reducing the thermal error of the machine tool: (1) thermal error prevention method, such as the use of thermal insulation materials, thermal symmetrical structural design and use of moving parts with small friction coefficient; all of which have high costs; and (2) thermal error compensation method, by establishing a thermal error prediction model, providing thermal error estimation, during the operation of the machine tool, to compensate. The second method is relatively low in cost and easy to implement, whereas the difficulty lies in the prediction accuracy and robustness of the established model.

Thermal error compensation is also divided into two ways: (1) non sensor mode, that is, no external temperature sensor is required, while thermal error prediction is performed only based on information, such as rotational speed and position in the numerical control system; (2) sensor mode, where temperature sensors need to be placed at critical locations, to make thermal error prediction based on temperature information.

The thermal error compensation, using the non-sensor method, has low cost, but the prediction robustness is poor, whereas the stability of the working conditions is high. Regarding the thermal error compensation method with sensors, although it is currently more robust to rotational speed fluctuations, etc., in the case of a large disturbance (such as the start and stop of the cooling system), the compensation effect appears deteriorated.

SUMMARY OF THE INVENTION

The invention aims to solve the problem of the existing spindle thermal error compensation method, not being robust enough to deal with the hot and cold disturbances, providing a new spindle thermal error compensation method that is insensitive to the cooling system disturbance, thus increasing compensation accuracy of the spindle thermal error and enhancing the robustness, which are essential elements of a method implemented in a real processing environment.

The Technical Solution of the Invention

A spindle thermal error compensation method that is insensitive to the disturbance of the cooling system, comprising the following steps:

First, the spindle model coefficient identification test, based on multi-state speed variable is performed; following, based on the correlation analysis between temperature and thermal error, the temperature measurement point, with significant correlation with the axial thermal error of the spindle, is determined; then, a spindle thermal error model is established, which is insensitive to the cooling system disturbance. In addition, the coefficients in the model are identified under constraint condition, according to the non-linear quadratic programming algorithm. Finally, the compensation value, as calculated by the model, is input to the numerical control system, using the OPC UA communication protocol, so as to realize the compensation for spindle thermal error. The compensation for spindle thermal error is implemented according to the following specific steps:

1) Test of Coefficient Identification of Spindle Thermal Error Model

Four temperature sensors are arranged on the surface of the spindle 1, at specific positions: the first temperature sensor 3 and the fourth temperature sensor 7 are respectively attached to the positions of the rear bearing 2 and the front bearing 6; the second temperature sensor 4 and the third temperature sensor 5 are evenly distributed between the rear bearing 2 and the front bearing 6, wherein the second temperature sensor 4 is adjacent to the rear bearing 2, the third temperature sensor 5 is close to the front bearing 6. The detecting rod 8 is mounted on the spindle, through the shank interface; the displacement sensor 9 is fixed on the working table 10, by a magnetic table seat; the fifth temperature sensor 12 is arranged on the bed frame 11;

The spindle runs at a range of speed values, where multiple states are included, such as rising speed, decreasing speed and starting or stopping. During this process, the first temperature sensor 3, the second temperature sensor 4 and the third temperature sensor 5 are simultaneously recorded, as well as measurement values of the fourth temperature sensor 7, the fifth temperature sensor 12, and the displacement sensor 9.

2) Definition of Spindle Temperature Measurement Point

Correlation analysis is carried out, between the collected temperature data of each position and the thermal error of the spindle. The correlation coefficient, between the temperature of each point and the thermal error of the spindle, is calculated as follows:

$$\rho_{T_j, E_Z} = \frac{\sum_{j=1}^{m} T_j(i) E_z(i) - \frac{\sum_{i=1}^{m} T_j(i) \sum_{i=1}^{m} E_z(i)}{m}}{\sqrt{\left(\sum_{i=1}^{m} T_j^2(i) - \frac{\left(\sum_{i=1}^{m} T_j(i)\right)^2}{m}\right)\left(\sum_{i=1}^{m} E_z^2(i) - \frac{\left(\sum_{i=1}^{m} E_z(i)\right)^2}{m}\right)}} \quad (1)$$

where, $\rho_{T_j, E_z}$ is the correlation coefficient between the measured value of the $j^{th}$ temperature sensor and the thermal error of the spindle, $T_j(i)$ is the temperature value measured by the $j^{th}$ temperature sensor at time instance i, $E_z(i)$ is the value of the spindle thermal error, measured by the displacement sensor 9 at time instance i, m is the amount of data, measured by the displacement sensor 9.

Based on the four temperature sensors on the spindle, the maximum thermal resistance coefficient of the spindle is determined, as well as the spindle temperature measurement point, while the temperature measurement value is set to the spindle temperature $T_{sp}$.

3) Establishment of Spindle Thermal Error Model

Let the temperature value, measured by the fifth temperature sensor 12, be $T_e$, while the calculation formula of the spindle temperature and the difference $T_{sp-e}$ is as follows:

$$T_{sp-e}(i)=(T_{sp}(i)-T_{sp}(1))-(T_e(i)-T_e(1)) \quad (2)$$

where, $T_{sp-e}(i)$ is the difference between $T_{sp}$ and $T_e$ at time instance i, $T_{sp}(i)$ is the measured spindle temperature at the measurement point at time instance i, $T_e(i)$ is the measured value of the fifth temperature sensor 12 at time instance i.

The variation of $T_{sp-e}$ $\Delta T_{sp-e}$ is calculated as follows:

$$\Delta T_{sp-e}(i)=T_{sp-e}(i)-T_{sp-e}(i-1) \quad (3)$$

where, $\Delta T_{sp-e}(i)$ is the fluctuation of $T_{sp-e}$ at time instance i.

The spindle thermal error model is as follows:

$$E_{ez}(i) = (1-\theta_1) \times E_{ez}(i-1) + \theta_3 \times \theta_1 \times \left( \Delta T_{sp-e}(i-1) + \frac{\Delta T_{sp-e}(i) - \Delta T_{sp-e}(i-1)}{\theta_2} \right) \quad (4)$$

where, $E_{ez}(i)$ is the calculated value of the spindle thermal error at time instance i, $\theta_1$, $\theta_2$ and $\theta_3$ are coefficients.

4) Identification of Model Coefficients

Based on the nonlinear quadratic programming algorithm, the coefficients $\theta_1$, $\theta_2$ and $\theta_3$ of the above thermal error model are identified under constraints. The objective function $F(\theta_1,\theta_2,\theta_3)$ is as follows:

$$\min[F(\theta_1, \theta_2, \theta_3)] = \min\left[\sum_{i=1}^{m} (E_z(i) - E_{ez}(i))\right] \quad (5)$$

$$\theta_{1min} \leq \theta_1 \leq \theta_{1max}$$
$$\theta_{2min} \leq \theta_2 \leq \theta_{2max}$$
$$\theta_{3min} \leq \theta_3 \leq \theta_{3max}$$

where, $\theta_{1min}$, $\theta_{2min}$ and $\theta_{3min}$ are the lower limit values of the coefficients $\theta_1$, $\theta_2$ and $\theta_3$ respectively, while $\theta_{1max}$, $\theta_{2max}$ and $\theta_{3max}$ are the upper limit values of the constraints, for coefficients $\theta_1$, $\theta_2$ and $\theta_3$, respectively.

5) Thermal Error Compensation Based on OPC UA

The spindle thermal error model runs on the compensator. The compensator sends the compensation value, as calculated by the model, to the numerical control system, using the OPC UA communication protocol. The numerical control system compensates the spindle thermal error, according to the calculated compensation value.

The invention has advantages that, the spindle thermal error model coefficient identification test, as described, adopts a multi-state speed variable, while it can obtain more abundant spindle thermal characteristics information, which is more realistic, according to the actual working conditions. The model demonstrates high prediction accuracy and strong robustness, especially in the case of disturbances, such as frequent startup of the cooling system. Compensation for the thermal error of the spindle can improve the machining and the machine tool accuracy; render unnecessary heat engine process after the machine is turned on, reduce energy waste, and improve processing efficiency. Furthermore, construction costs were saved by introducing ambient temperature into the thermal error model, and ensuring good compensation effect in non-constant temperature workshops. Thus, precision machining no longer requires constant temperature environment.

Figure 1:
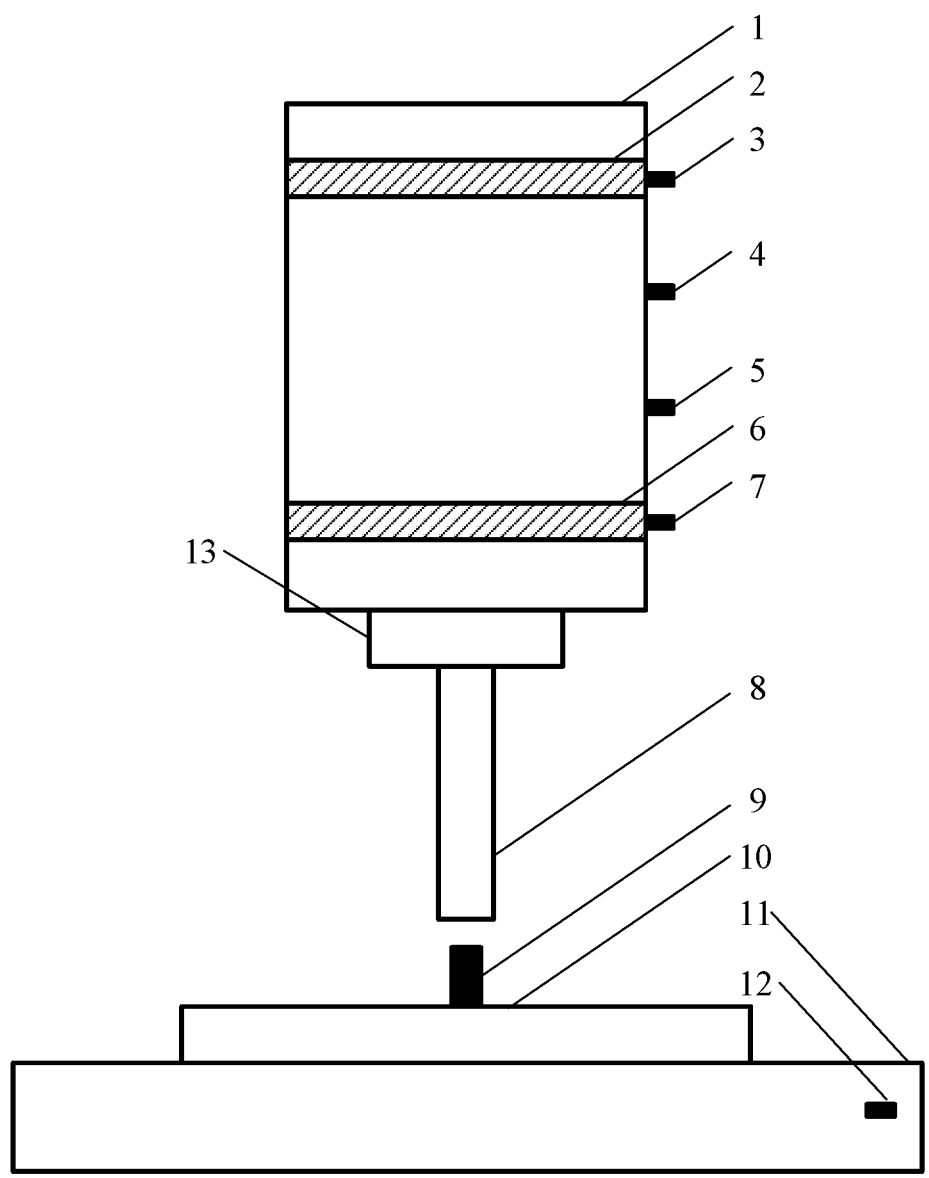
FIG. 1 is a schematic diagram of the spindle temperature measuring points arrangement and thermal error testing.

In the figures: 1 spindle; 2 spindle rear bearing; 3 first temperature sensor; 4 second temperature sensor; 5 third temperature sensor; 6 spindle rear bearing; 7 fourth temperature sensor; 8 detecting rod; 9 displacement sensor; 10 working table; 11 bed frame; 12 fifth temperature sensor; 13 shank interface.

DETAILED DESCRIPTION

In order to make the objectives, technical solutions and advantages of the present invention more apparent, the present invention is described in detail below with reference to the accompanying drawings.

An embodiment of the present invention will be described in detail, by taking as an example a vertical machining center spindle. The maximum spindle speed of the machining center is 12000 r/min. The spindle is equipped with a water cooling device.

The first step is the parameter identification test of the spindle thermal error model.

Four temperature sensors are arranged on the surface of the spindle 1, where specifically, the first temperature sensor 3 and the fourth temperature sensor 7 are attached to the positions of the rear bearing 2 and the front bearing 6, respectively; the second temperature sensor 4 and the third temperature sensor 5 are evenly distributed between the rear bearing 2 and the front bearing 6, wherein the second temperature sensor 4 is close to the rear bearing 2 and the third temperature sensor 5 is close to the front bearing 6; the detecting rod 8 is mounted on the spindle, through the shank interface; the displacement sensor 9 is fixed on the table 10 by a magnetic table seat; the fifth temperature sensor 12 is arranged on the bed frame 11.

Let the spindle run in the order shown in Table 1.

TABLE 1

Spindle operation sequence table

| Serial number | Spindle speed (r/min) | Operation hours (mm) |
| --- | --- | --- |
| 1 | 1000 | 30 |
| 2 | 4000 | 20 |
| 3 | 6000 | 10 |
| 4 | 8000 | 30 |
| 5 | 2000 | 60 |
| 6 | 0 | 120 |
| 7 | 4000 | 70 |
| 8 | 10000 | 60 |
| 9 | 0 | 20 |

The measured values from temperature sensors (3, 4, 5, 7 and 12) and the displacement sensor 9 are simultaneously recorded, during the operation of the spindle.

The second step, the spindle temperature measurement point is determined.

Correlation analysis is carried out, between the collected temperature data of each position and the thermal error of the spindle. The correlation coefficient, between the temperature of each point and the thermal error of the spindle, is calculated as follows:

$$\rho_{T_j,E_z} = \frac{\sum_{i=1}^{m} T_j(i) E_z(i) - \frac{\sum_{i=1}^{m} T_j(i) \sum_{i=1}^{m} E_z(i)}{m}}{\sqrt{\left(\sum_{i=1}^{m} T_j^2(i) - \frac{\left(\sum_{i=1}^{m} T_j(i)\right)^2}{m}\right)\left(\sum_{i=1}^{m} E_z^2(i) - \frac{\left(\sum_{i=1}^{m} E_z(i)\right)^2}{m}\right)}} \quad (1)$$

where, $\rho_{T_j,E_z}$ is the correlation coefficient between the measured value of the $j^{th}$ temperature sensor and the thermal error of the spindle, $T_j(i)$ is the temperature value measured by the $j^{th}$ temperature sensor at time instance i, $E_z(i)$ is the spindle thermal error value, measured by the displacement sensor 9 at time instance i, m is the amount of data measured by the displacement sensor 9.

The correlation coefficient between the measured values of the temperature sensors 3, 4, 6, and 7 and the measured values of the displacement sensor 9 is calculated according to the Eq. (1). The specific results are shown in Table 2.

TABLE 2

Correlation coefficient between temperature and thermal error of the spindle

| Temperature Sensor | Correlation coefficient |
|---|---|
| First Temperature Sensor 3 | 0.9145 |
| Second Temperature Sensor 4 | 0.9546 |
| Third Temperature Sensor 6 | 0.9039 |
| Fourth Temperature Sensor 7 | 0.7880 |

The second temperature sensor 4, having the largest correlation coefficient with the thermal error, is selected as the spindle temperature measuring point, while its temperature measurement value is set as the spindle temperature $T_{sp}$.

The third step is to establish the spindle thermal error model.

Let the temperature value measured by the fifth temperature sensor 12 be $T_e$, while the calculation formula of the spindle temperature and the difference $T_{sp-e}$ is as follows:

$$T_{sp-e}(i) = (T_{sp}(i) - T_{sp}(1)) - (T_e(i) - T_e(1)) \quad (2)$$

where, $T_{sp-e}(i)$ is the difference between $T_{sp}$ and $T_e$ at time instance i, $T_{sp}(i)$ is the measured value of the spindle temperature at the measurement point at time instance i, $T_e(i)$ is the measured value of the fifth temperature sensor 12 at time instance i.

The variation of Tsp-e ΔTsp-e is calculated as follows:

$$\Delta T_{sp-e}(i) = T_{sp-e}(i) - T_{sp-e}(i-1) \quad (3)$$

where, $\Delta T_{sp-e}(i)$ is the amount of change of $T_{sp-e}$ at time instance i.

The spindle thermal error model formula is as follows:

$$E_{ez}(i) = (1-\theta_1) \times E_{ez}(i-1) + \theta_3 \times \theta_1 \times \left(\Delta T_{sp-e}(i-1) + \frac{\Delta T_{sp-e}(i) - \Delta T_{sp-e}(i-1)}{\theta_2}\right) \quad (4)$$

where, $E_{ez}(i)$ is the calculated value of the spindle thermal error at time instance i, $\theta_1$, $\theta_2$ and $\theta_3$ are coefficients.

The fourth step is about the identification of model coefficients.

Based on the nonlinear quadratic programming algorithm, the coefficients $\theta_1$, $\theta_2$ and $\theta_3$, in the above thermal error model, are identified under constraints. The objective function $F(\theta_1,\theta_2,\theta_3)$ is as shown in the following equation.

$$\min[F(\theta_1, \theta_2, \theta_3)] = \min\left[\sum_{i=1}^{m}(E_z(i) - E_{ez}(i))\right] \quad (5)$$

$$\theta_{1min} \le \theta_1 \le \theta_{1max}$$
$$\theta_{2min} \le \theta_2 \le \theta_{2max}$$
$$\theta_{3min} \le \theta_3 \le \theta_{3max}$$

where, $\theta_{1min}$, $\theta_{2min}$ $\theta_{3min}$ are the lower bounds of the coefficients $\theta_1$, $\theta_2$ and $\theta_3$ respectively, while $\theta_{1max}$, $\theta_{2max}$ and $\theta_{3max}$ are the upper limit values of the coefficients $\theta_1$, $\theta_2$ and $\theta_3$, respectively.

The spindle thermal error model is established according to Eqs. (2) to (4). According to Eq. (5), the parameters in the model are identified, while the identification result is: $\theta_1 = 7.5 \times 10^{-5}$, $\theta_2 = 9.8 \times 10^{-3}$, $\theta_3 = 408.1$ μm/□.

The fifth step is thermal error compensation based on OPC UA

Figure 2:
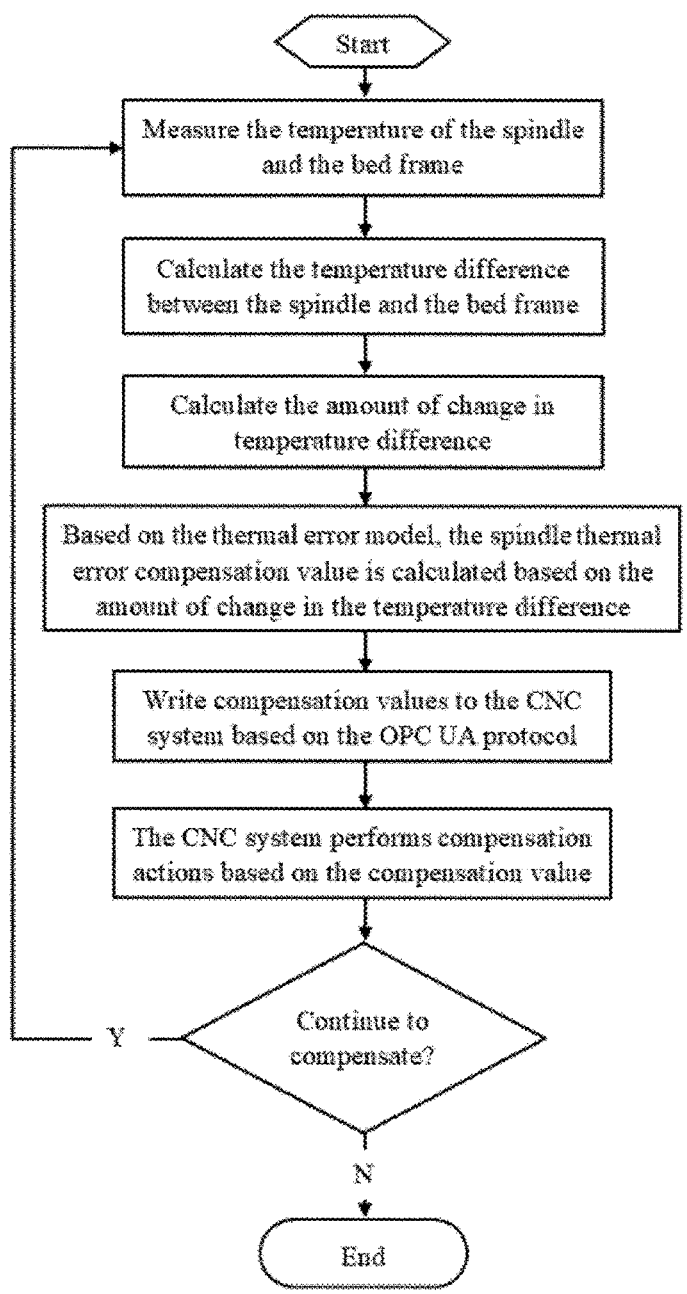
FIG. 2 is a flow chart of the spindle thermal error compensation.

The spindle thermal error model is implemented on the compensator, while the compensation value, as calculated by the model, is sent to the numerical control system, using the OPC UA communication protocol. The numerical control system compensates for the thermal error of the spindle, according to the received compensation value. The compensation process is shown in FIG. 2.

Figure 3A:
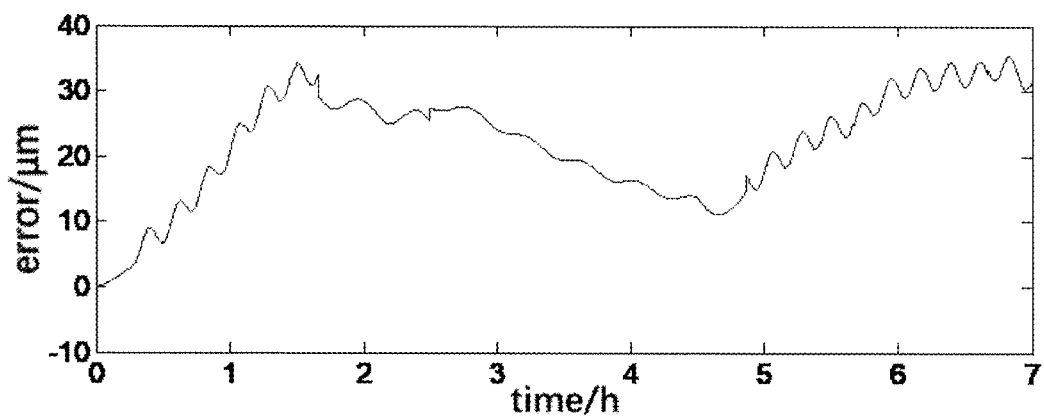
FIG. 3(a) is the spindle thermal error curve, before compensation.
Figure 3B:
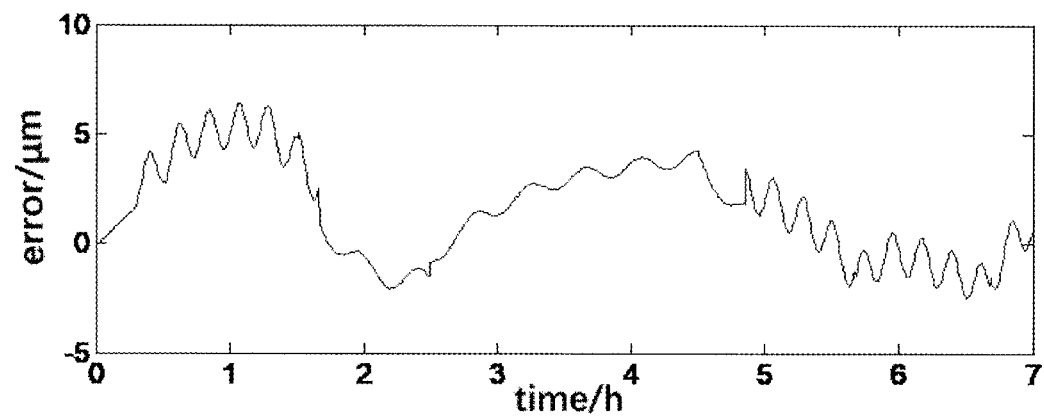
FIG. 3(b) is the compensated spindle thermal error curve.

FIG. 3(*a*) and FIG. 3(*b*) illustrate the comparison result, before and after thermal error compensation, of the vertical machining center spindle, as obtained by the aforementioned steps. FIG. 3(*a*) is the thermal error curve of the spindle, before compensation, while FIG. 3(*b*) is the thermal error curve of the spindle, after compensation.

The invention claimed is:

1. A spindle thermal error compensation method that is against a disturbance of a cooling system, first, a spindle model coefficient identification test, based on multi-state speed variable, is performed; after which, based on a correlation analysis between temperature and thermal error, a temperature measurement point, a greatest correlated with an axial thermal error of the spindle, is determined; next, a spindle thermal error model is established, which is insensitive to a cooling system disturbance; in addition, coefficients in a model are identified under constraint condition, according to a nonlinear quadratic programming algorithm; finally, based on an OPC UA communication protocol, a compensation value, as calculated by the spindle thermal error model, is input to a numerical control system, in order to realize a compensation of the spindle thermal error; wherein, the steps are as follows:

1) test of coefficient identification of the spindle thermal error model four temperature sensors are arranged on a surface of a spindle at specific positions: a first temperature sensor and a fourth temperature sensor are respectively attached to positions of a rear bearing and a front bearing; a second temperature sensor and a third temperature sensor are evenly distributed between the rear bearing and the front bearing, wherein the second temperature sensor is adjacent to the rear bearing, the third temperature sensor is close to the front bearing; a detecting rod is mounted on the spindle, through a shank interface on the spindle; a displacement sensor is fixed on a working table; a fifth temperature sensor is arranged on a bed frame;

the spindle runs at a range of speed values, where multiple states include rising speed, decreasing speed and starting or stopping; during this process, the first temperature sensor, the second temperature sensor and the third temperature sensor are simultaneously recorded, as well as measurement values of the fourth temperature sensor, the fifth temperature sensor, and the displacement sensor;

2) definition of spindle temperature measurement point correlation analysis is carried out, between collected temperature data of each position and the thermal error of the spindle; a correlation coefficient, between the temperature of each point and the thermal error of the spindle, is calculated as follows:

$$\rho_{T_j,E_Z} = \frac{\sum_{i=1}^{m} T_j(i)E_z(i) - \frac{\sum_{i=1}^{m} T_j(i)\sum_{i=1}^{m} E_z(i)}{m}}{\sqrt{\left(\sum_{i=1}^{m} T_j^2(i) - \frac{\left(\sum_{i=1}^{m} T_j(i)\right)^2}{m}\right)\left(\sum_{i=1}^{m} E_z^2(i) - \frac{\left(\sum_{i=1}^{m} E_z(i)\right)^2}{m}\right)}} \quad (1)$$

where, $\rho_{T_j,E_z}$ is the correlation coefficient between the measured value of a $j^{th}$ temperature sensor and the thermal error of the spindle, $T_j(i)$ is a temperature value measured by the $j^{th}$ temperature sensor at time instance i, $E_z(i)$ is a value of the spindle thermal error, measured by the displacement sensor at time instance i, m is an amount of data, measured by the displacement sensor;

based on the four temperature sensors on the spindle, a maximum thermal resistance coefficient of the spindle is determined, as well as the spindle temperature measurement point, while a temperature measurement value is set to the spindle temperature $T_{sp}$;

3) establishment of spindle thermal error model let the temperature value, measured by a fifth temperature sensor 12, be $T_e$, while a calculation formula of the spindle temperature and a difference $T_{sp-e}$ is as follows:

$$T_{sp-e}(i)=(T_{sp}(i)-T_{sp}(1))-(T_e(i)-T_e(1)) \quad (2)$$

where, $T_{sp-e}(i)$ is a difference between $T_{sp}$ and $T_e$ at time instance i, $T_{sp}(i)$ is a measured spindle temperature at the measurement point at time instance i, $T_e(i)$ is a measured value of the fifth temperature sensor 12 at time instance i;

a variation of $T_{sp-e}$ $\Delta T_{sp-e}$ is calculated as follows:

$$\Delta T_{sp-e}(i)=T_{sp-e}(i)-T_{sp-e}(i-1) \quad (3)$$

where, $\Delta T_{sp-e}(i)$ is a fluctuation of $T_{sp-e}$ at time instance i; the spindle thermal error model is as follows:

$$E_{ez}(i) = (1-\theta_1)\times E_{ez}(i-1) + \theta_3\times\theta_1\times\left(\Delta T_{sp-e}(i-1) + \frac{\Delta T_{sp-e}(i)-\Delta T_{sp-e}(i-1)}{\theta_2}\right) \quad (4)$$

where, $E_{ez}(i)$ is a calculated value of the spindle thermal error at time instance i, $\theta_1$, $\theta_2$ and $\theta_3$ are coefficients;

4) identification of model coefficients based on a nonlinear quadratic programming algorithm, coefficients $\theta_1$, $\theta_2$ and $\theta_3$ of the spindle thermal error model are identified under constraints; a objective function $F(\theta_1,\theta_2,\theta_3)$ is as follows:

$$\min[F(\theta_1,\theta_2,\theta_3)] = \min\left[\sum_{i=1}^{m}(E_z(i)-E_{ez}(i))\right] \quad (5)$$

$$\theta_{1min} \leq \theta_1 \leq \theta_{1max}$$
$$\theta_{2min} \leq \theta_2 \leq \theta_{2max}$$
$$\theta_{3min} \leq \theta_3 \leq \theta_{3max}$$

where, $\theta_{1min}$, $\theta_{2min}$ and $\theta_{3min}$ are lower limit values of the coefficients $\theta_1$, $\theta_2$ and $\theta_3$ respectively, while $\theta_{1max}$, $\theta_{2max}$ and $\theta_{3max}$ are upper limit values of the constraints, for coefficients $\theta_1$, $\theta_2$ and $\theta_3$, respectively;

5) thermal error compensation based on OPC UA the spindle thermal error model runs on a compensator, the compensator sends a compensation value, as calculated by the model, to a numerical control system, using the OPC UA communication protocol, the numerical control system compensates the spindle thermal error, according to the calculated compensation value.

* * * * *